(12) United States Patent
Trpkovski (10) Patent No.: US 6,591,988 B2
(45) Date of Patent: Jul. 15, 2003

(54) MATERIAL HANDLING FOR THE INSULATING GLASS INDUSTRY

(75) Inventor: Paul Trpkovski, Loganville, WI (US)

(73) Assignee: Cardinal Glass Industries, Inc., Eden Prairie, MN (US)

( * ) Notice: Subject to any disclaimer, the term of this patent is extended or adjusted under 35 U.S.C. 154(b) by 0 days.

(21) Appl. No.: 10/050,742

(22) Filed: Jan. 15, 2002

(65) Prior Publication Data

US 2002/0098076 A1 Jul. 25, 2002

Related U.S. Application Data

(60) Provisional application No. 60/262,807, filed on Jan. 19, 2001.

(51) Int. Cl.[7] ................................................ B65D 85/48

(52) U.S. Cl. ........................................ 206/454; 206/386

(58) Field of Search ................................. 206/449, 454, 206/446, 443, 448, 456, 386, 596, 59; 211/41.14, 41.15, 41.17, 60.1

(56) References Cited

U.S. PATENT DOCUMENTS

| | | | |
|---|---|---|---|
| 2,459,627 A | | 1/1949 | Cox |
| 3,028,186 A | | 4/1962 | Skubic |
| 3,157,424 A | | 11/1964 | Hall |
| 3,173,556 A | | 3/1965 | Gaudriot et al. |
| 3,503,519 A | | 3/1970 | Jay |
| 3,537,599 A | | 11/1970 | Jay |
| 3,800,980 A | | 4/1974 | Takeuchi et al. |
| 3,870,165 A | | 3/1975 | Besijn |
| 3,876,489 A | | 4/1975 | Chenel |
| 4,000,818 A | | 1/1977 | Schmid et al. |
| 4,033,597 A | | 7/1977 | Boyer |
| 4,045,071 A | | 8/1977 | Dunstan |
| 4,093,251 A | * | 6/1978 | Boyer .......................... 410/43 |
| 4,252,486 A | | 2/1981 | Soligno |
| 4,368,822 A | * | 1/1983 | Kramer et al. ............. 211/85.8 |
| 4,465,313 A | | 8/1984 | Val |
| 4,495,023 A | | 1/1985 | Lisec |
| 4,574,553 A | | 3/1986 | Lisec |
| 4,743,336 A | | 5/1988 | White |
| 4,769,105 A | | 9/1988 | Lisec |
| 4,820,101 A | | 4/1989 | Fenn |
| 4,836,005 A | | 6/1989 | Lisec |
| 4,885,926 A | | 12/1989 | Lisec |
| 4,886,410 A | | 12/1989 | Lisec |
| 4,902,213 A | | 2/1990 | Lisec |
| 4,949,666 A | | 8/1990 | Lisec |
| 4,961,816 A | | 10/1990 | Lisec |
| 5,117,669 A | | 6/1992 | Lisec |
| 5,147,176 A | | 9/1992 | Stolzer et al. |
| 5,161,401 A | | 11/1992 | Lisec |
| 5,181,412 A | | 1/1993 | Lisec |

(List continued on next page.)

FOREIGN PATENT DOCUMENTS

| | | |
|---|---|---|
| EP | 0 288 426 A2 | 2/1988 |
| WO | WO 00/43235 | 7/2000 |

*Primary Examiner*—Shian Luong
(74) *Attorney, Agent, or Firm*—Allen W. Groenke; Fredrikson & Byron, P.A.

(57) ABSTRACT

Methods and apparatus for handling material for the insulating glass industry are disclosed. One method of handling material for the insulating glass industry in accordance with the present invention includes the step of arranging a plurality of bars into a plurality of stacks with adjacent stacks defining spaces dimensioned to receive a bar engaging member. The stacks of bars may then be transported to a desired destination. A bar engaging member may be inserted into a space defined by the stacks, and one or more bars may be grasped using the bar engaging member. A container for handling material for the insulating glass industry is also disclosed. The container may advantageously include a plurality of prearranged bar locating members configured to hold a predetermined type of bar stock.

8 Claims, 14 Drawing Sheets

U.S. PATENT DOCUMENTS

| | | |
|---|---|---|
| 5,243,844 A | 9/1993 | Lisec |
| 5,377,473 A | 1/1995 | Narayan et al. |
| 5,395,200 A | 3/1995 | Meier |
| 5,439,716 A | 8/1995 | Larsen |
| 5,465,883 A * | 11/1995 | Woodward .................. 224/495 |
| 5,514,432 A | 5/1996 | Lisec |
| 5,641,076 A * | 6/1997 | Englund .................. 211/41.14 |
| 5,679,419 A | 10/1997 | Larsen |
| 5,705,010 A | 1/1998 | Larsen |
| 5,714,214 A | 2/1998 | Larsen |
| 5,769,105 A | 6/1998 | Margol et al. |
| 5,794,481 A | 8/1998 | Lisec |
| 5,816,774 A | 10/1998 | Stolzer et al. |
| 5,850,924 A * | 12/1998 | Borter .................... 211/41.14 |
| 5,884,778 A * | 3/1999 | Freiheit .................... 211/41.14 |
| 5,938,047 A | 8/1999 | Ellis et al. |
| 6,102,206 A | 8/2000 | Pride |
| 6,164,883 A | 12/2000 | Wilcox |
| 6,197,231 B1 | 3/2001 | Lisec |
| 6,202,863 B1 | 3/2001 | Grenier |
| 6,457,619 B1 * | 10/2002 | Werner et al. .............. 224/405 |

\* cited by examiner

MATERIAL HANDLING FOR THE INSULATING GLASS INDUSTRY

RELATED APPLICATIONS

This application is related to and claims priority to U.S. patent application Ser. No. 60/262,807 by Trpkovski filed on Jan. 19, 2001 and the entire disclosure of which is hereby incorporated by reference.

FIELD OF THE INVENTION

The present invention relates generally to methods and apparatus for handling material for the insulating glass industry. More particularly, the present invention relates to methods and apparatus for handling elongate barstock that is useful for forming components such as, for example, spacer frames and muntin bar lattices.

BACKGROUND OF THE INVENTION

Today, insulating glass units have achieved widespread use as building components. In order to produce insulating glass units inexpensively and in high volume, modern manufacturing of insulating glass units is often mechanized and/or automated. Various materials may be used to manufacture insulating glass units, including sheets of glass, spacer frames, and various sealants. Insulating glass units may also include muntin bars. Muntin bars may be used for both functional and decorative purposes with glass windows or doors. The muntin bars are particularly useful when they retain their geometric configuration and do not separate, as well as when they are able to remain in a flat mating surface relation with the glass.

SUMMARY OF THE INVENTION

The present invention relates generally to methods and apparatus for handling material for the insulating glass industry. More particularly, the present invention relates to methods and apparatus for handling elongate barstock that is useful for forming components such as, for example, spacer frames and muntin bar lattices. One method of handling material for the insulating glass industry in accordance with the present invention includes the step of arranging a plurality of bars into a plurality of stacks with adjacent stacks defining spaces dimensioned to receive a bar engaging member. The stacks of bars may then be transported to a desired destination. A bar engaging member may be inserted into a space defined by the stacks, and one or more bars may be grasped using the bar engaging member. In some implementations of the invention, the step of grasping one or more bars using the first bar engaging member includes the steps of inserting a second bar engaging member into a second space defined by the stacks and trapping one or more bars between the bar engaging member and the second bar engaging member.

A container for handling material for the insulating glass industry is also disclosed. In some implementations, the container includes a container frame and a plurality of combs selectively fixed to the frame. In one aspect of the present invention, each comb includes a plurality of tines that are spaced to define a plurality of channels dimensioned to accept bars having a predetermined width. In another aspect of the present invention, the tines are dimensioned to create spaces between adjacent channels, with each space being dimensioned to receive a bar engaging member. In some implementations, each tine comprises a shaft and a sleeve disposed over the shaft. The sleeve may advantageously comprise a no-mar material.

In some implementations, the present invention includes a container having a frame and a plurality of combs that are selectively fixed to the frame by a coupling mechanism. In some implementations, the coupling mechanism comprises a plunger fixed to the frame of the container and a detent defined by a base of the comb. The detent may be advantageously dimensioned to accept at least a portion of the plunger. The plunger may comprise, for example, a ball and a spring arranged to bias the ball toward the detent.

In certain advantageous implementations, the present invention utilizes a container including a first forklift interface and a second forklift interface. In some implantations, each forklift interface comprises a first receptacle and a second receptacle. Each receptacle may comprise, for example, a lumen defined by a tube. In some advantageous implementations, each forklift interface comprises a first tube positioned on a first side of a centroid of the container and a second tube disposed on a second side of the centroid of the container. When this is the case, the first tube and the second tube may be advantageously positioned substantially equidistantly from the centroid of the container.

A method of handling a first type of bars having a first dimension and a second type of bars having a second dimension is also disclosed. In some implementations, this method includes the step of providing a container including a frame and a first set of combs selectively fixed to the frame. Each comb in the first set of combs preferably has a plurality of tines spaced to accept bars having the first dimension. The first set of combs may be removed from the container and a second set of combs may be selectively fixed to the frame of the container. In certain implementations, each comb in the second set of combs advantageously has a plurality of tines spaced to accept bars having the second dimension.

Another method in accordance with the present invention may include the following steps:
1) Providing a container having a plurality of prearranged muntin bar retaining channels configured to hold a predetermined type of bars.
2) Placing a plurality of bars in the retaining channels of the container.
3) Placing a plurality of containers in a transportation vehicle. In some applications, the containers may be stacked in a semi trailer.
4) Removing the containers from the transportation vehicle.
5) Delivering at least one container to an arrival bay arranged to receive a container.
6) Sequentially removing bars from the container one at a time.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
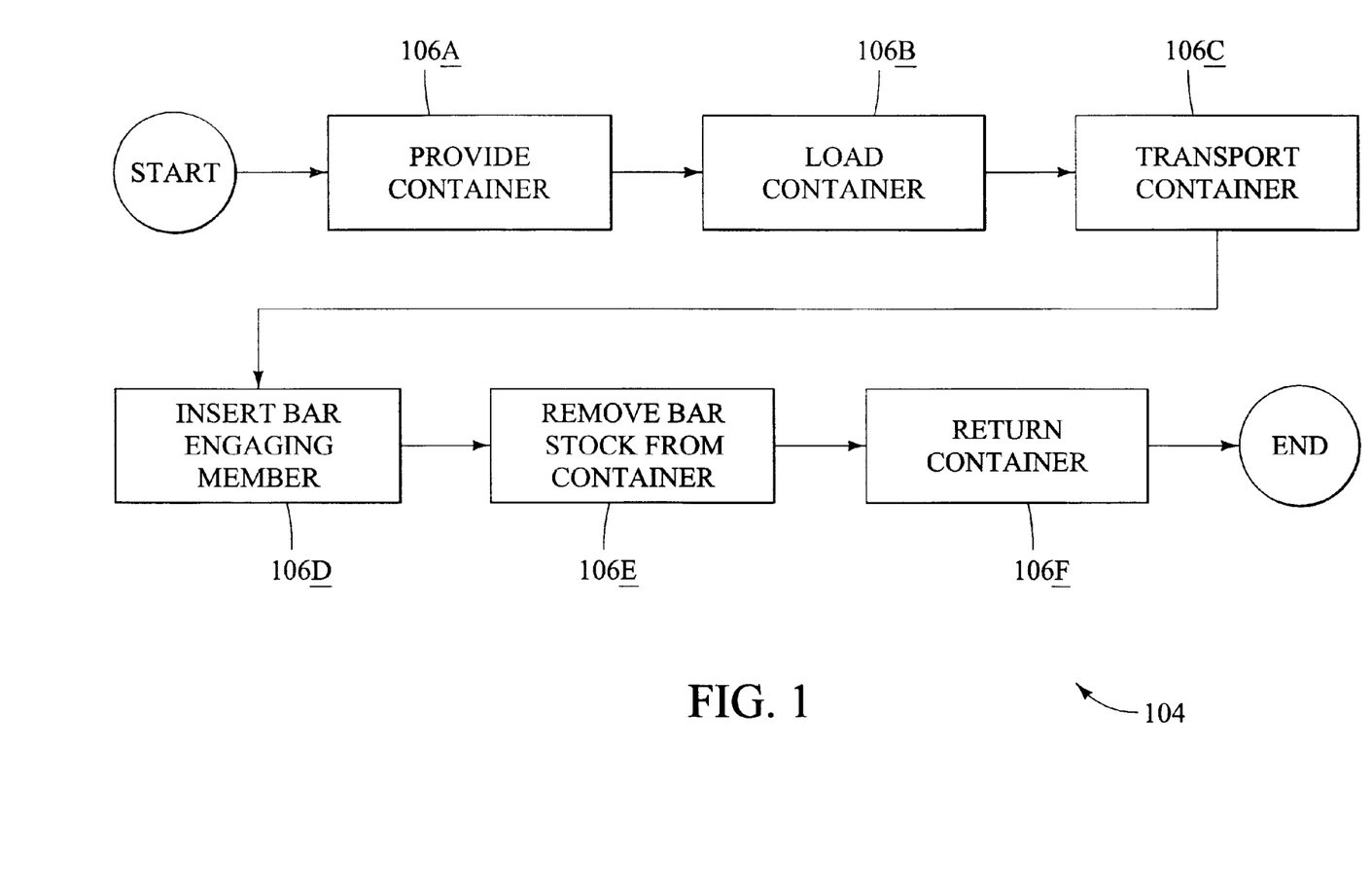
FIG. 1 is a flow chart illustrating a method of handling material for the insulating glass industry.

FIG. 1 is a flow chart 104 illustrating a method of handling material for the insulating glass industry. The material being handled may comprise, for example, bar stock useful in the insulating glass industry. Various types of bar stock may be used without deviating from the spirit and scope of the present invention. For example, bar stock suitable for forming spacer frames useful in the insulating glass industry may be used. By way of a second example, bar stock suitable for forming muntin bar lattices may also be used.

Bar stock used in the insulating glass industry often comprises thin sheet metal (e.g., 4.5 mil stainless steel, 6.0 mil aluminum, and the like). This thin sheet metal can be easily damaged during handling. For example, the bar stock may be scratched, bent and/or dented. Some types of bar stock may include a finish such as, for example, paint. This finish may be particularly susceptible to scratching.

Block 106A of flow chart 104 comprises the step of providing a container. The container may be provided, for example, proximate a source of bar stock. This source of bar stock may be, for example, a factory where bar stock is fabricated. In a preferred method in accordance with the present invention, the container includes a plurality of prearranged bar locating members configured to hold a predetermined type of bar stock. In some methods in accordance with the present, the container is provided at a location where bar stock is being fabricated and the bar stock is placed in the container soon after being fabricated. Placing the bar stock in the contained soon after it is fabricated reduces the likelihood that the bar stock will be damaged.

In one exemplary embodiment, the bar locating members comprise tines which include a no-mar sleeve. The no-mar sleeve may reduce the likelihood that the outer surface of the bar stock is scratched during handling.

Block 106B of flow chart 104 comprises the step of loading the container. The step of loading the container may involve placing a plurality of bars between the bar locating members of the container. This step may also involve arranging a plurality of bars into a plurality of stacks with adjacent stacks defining spaces dimensioned to receive a bar engaging member.

Block 106C of flow chart 104 comprises the step of transporting the container. The step of transporting the container may involve placing a plurality of containers in a transportation vehicle. In some applications, the containers may be arranged in an interlocking fashion in the vehicle. The step of transporting the container may also involve removing the plurality of containers from the transportation vehicle. The step of transporting the container may also involve delivering at least one container to an arrival bay arranged to receive the container. The container may be delivered to the arrival bay using a vehicle, for example, a fork lift.

Block 106D of flow chart 104 comprises the step of inserting a bar engaging member into a space defined by adjacent stacks of bar stock. Various bar engaging members may be utilized without deviating from the spirit and scope of the present invention. Bar engaging members suitable for some applications may comprise, for example, grippers, pinchers, fingers, and vacuum cups.

Block 106E of flow chart 104 comprises the step of removing bar stock from the container. In some methods in accordance with the present invention, bar stock is removed one piece at a time. In other methods in accordance with the present invention, a plurality of pieces of bar stock are grasped and removed from the container.

Block 106F comprises the step of returning the container. The container may be returned, for example, to the bar stock source. At the bar stock source, the container may by reloaded by placing a plurality of bars between the bar locating members of the container.

Figure 2:
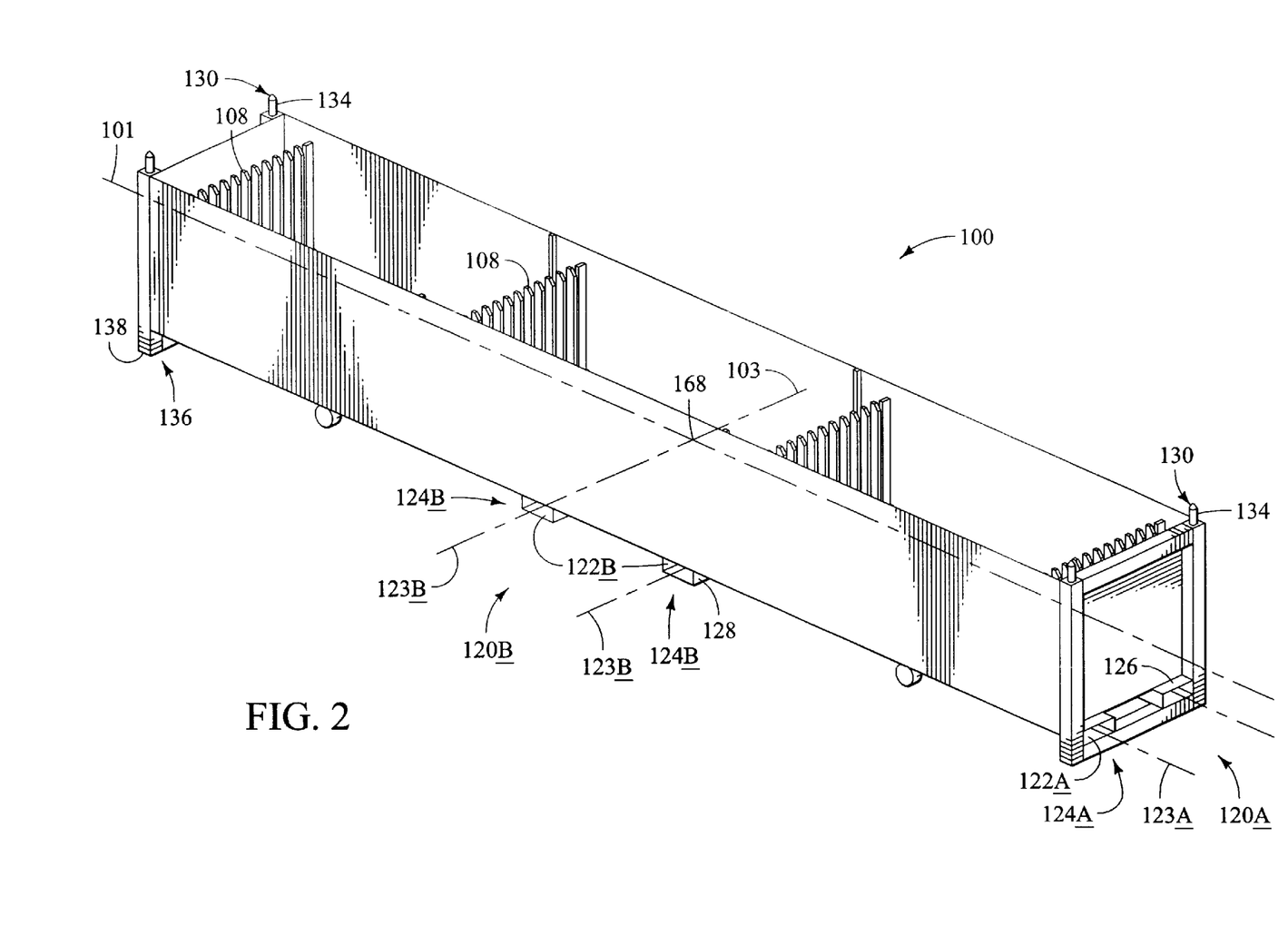
FIG. 2 is a perspective view of a container in accordance with the present invention.

FIG. 2 is a perspective view of a container 100 in accordance with the present invention. Container 100 of FIG. 2 includes a plurality of pre-arranged bar locating members 108 dimensioned and spaced for holding and dispensing a desired type of bar stock. Container 100 of FIG. 2 also includes a first forklift interface 120A and a second fork lift interface 120B. First forklift interface 120A comprises a plurality of receptacles 124A that are preferably dimensioned to receive the forks of a forklift. In the embodiment of FIG. 2, each receptacle 124A comprises a lumen 122A defined by a beam 126. Second forklift interface 120B comprises a plurality of receptacles 124B that are also preferably dimensioned to receive the forks of a forklift. In the embodiment of FIG. 2, each receptacle 124B comprises a lumen 122B defined by a cross member 128. As shown in FIG. 2, each lumen 122A has a central axis 123A and each lumen 122B has a central axis 123B. In a preferred embodiment, the forks of a fork lift may be inserted into either end of lumens 122A, 122B.

Container 100 has longitudinal axis 101 and a lateral axis 103 that intersect at a centroid 168 of container 100. In the embodiment of FIG. 2, beams 126 and cross members 128 both comprise lengths of tubing having a generally rectangular cross section. In FIG. 2, it may be appreciated that each forklift interface comprises a first tube positioned on a first side of centroid 168 of container 100 and a second tube disposed on a second side of centroid 168 of container 100. In the embodiment of FIG. 2, the first tube and the second tube of each forklift interface are positioned substantially equidistantly from centroid 168 of container 100.

In FIG. 2 it may be appreciated that first forklift interface 120A and a second fork lift interface 120B are disposed at an angle relative to one another. In the embodiment of FIG. 2, each cross member 128 is arranged at about a 90 degree angle relative to each beam 126.

In FIG. 2, it may be appreciated that container 100 includes a plurality of first mating elements 130 and second mating elements 132. In the embodiment of FIG. 2 each first mating element 130 comprises a post 134 and each second mating element 136 comprises a socket 138. In some embodiments of the present invention, sockets 140 are dimensioned and located to accept the posts 142 of a second substantially similar container.

Figure 3:
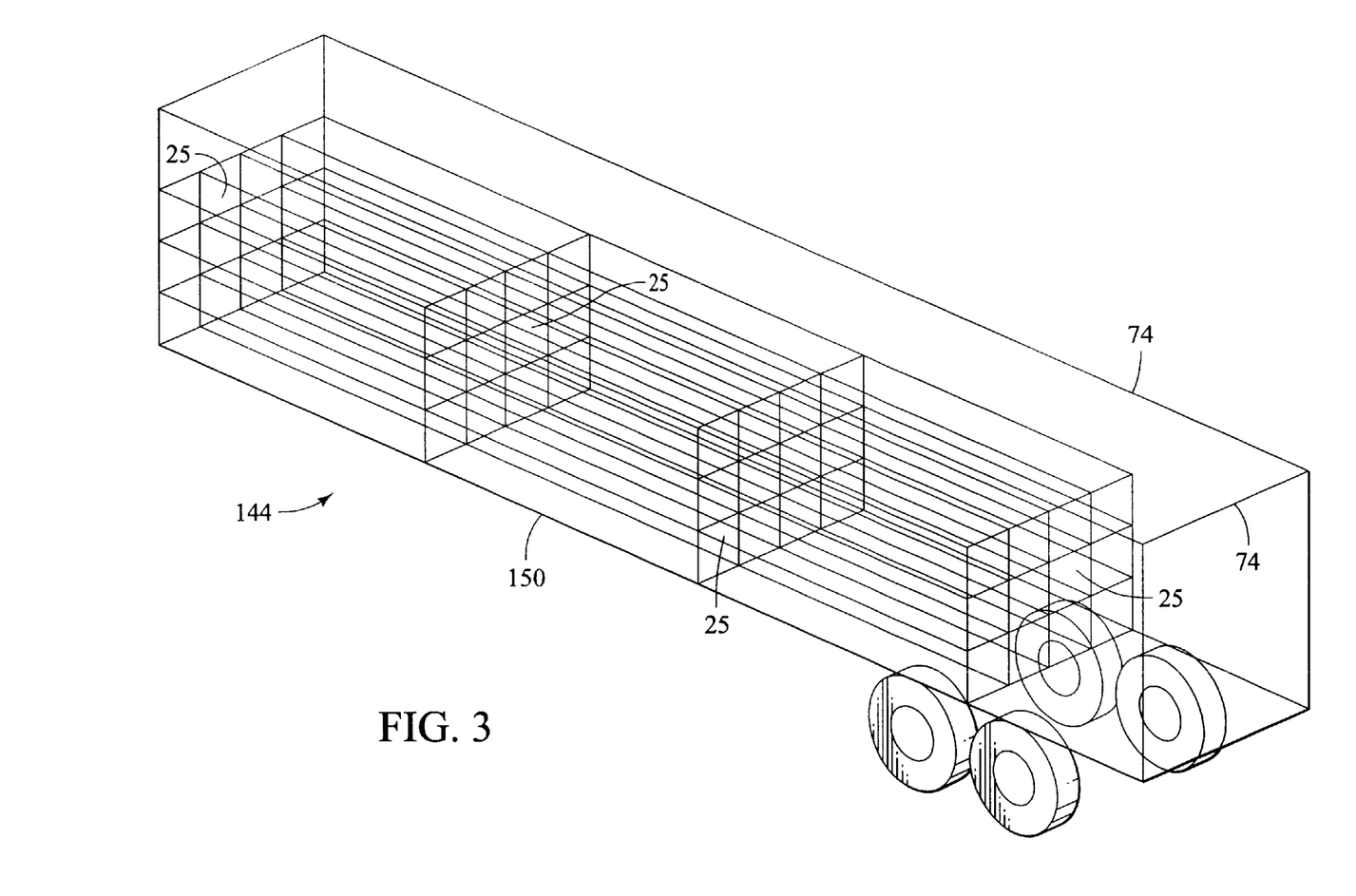
FIG. 3 is a perspective view of an assembly including a vehicle and a plurality of containers that are disposed within the walls of vehicle.

FIG. 3 is a perspective view of an assembly including a vehicle 144 and a plurality of containers 25 that are disposed within the walls 74 of vehicle 144. In some methods in accordance with the present invention, a plurality of containers 25 are mated with one another in an interlocking stacked configuration. In the embodiment of FIG. 3, vehicle 144 comprises a semitrailer 150. It is to be appreciated that a container may be transported using various vehicles without deviating from the spirit and scope of the present invention. Examples of vehicles which may be suitable in some applications include trucks, airplanes, ships, trains, and fork lifts.

Figure 4:
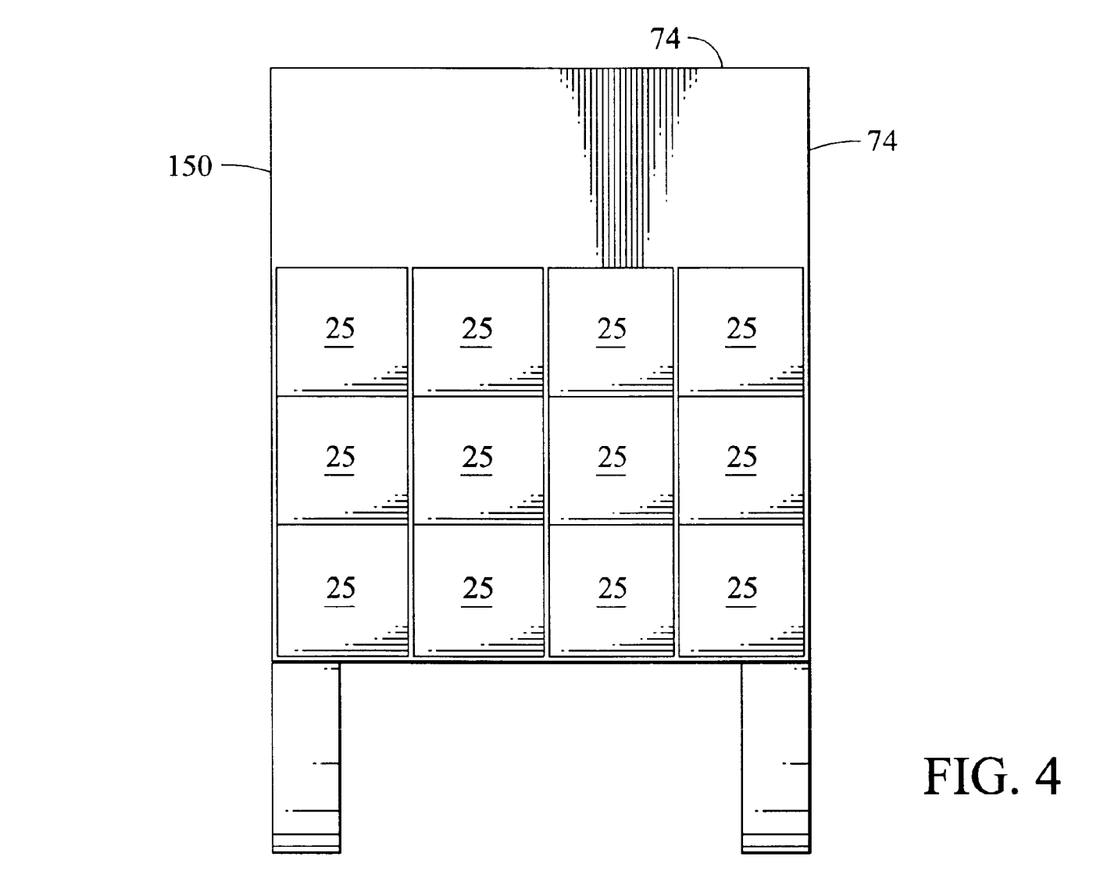
FIG. 4 is a plan view of an assembly including a semi-trailer and a plurality of containers located within a plurality of walls of semitrailer.

FIG. 4 is a plan view of an assembly including a semi-trailer 150 and a plurality of containers 25 located within a plurality of walls 74 of semitrailer 150.

Figure 5:
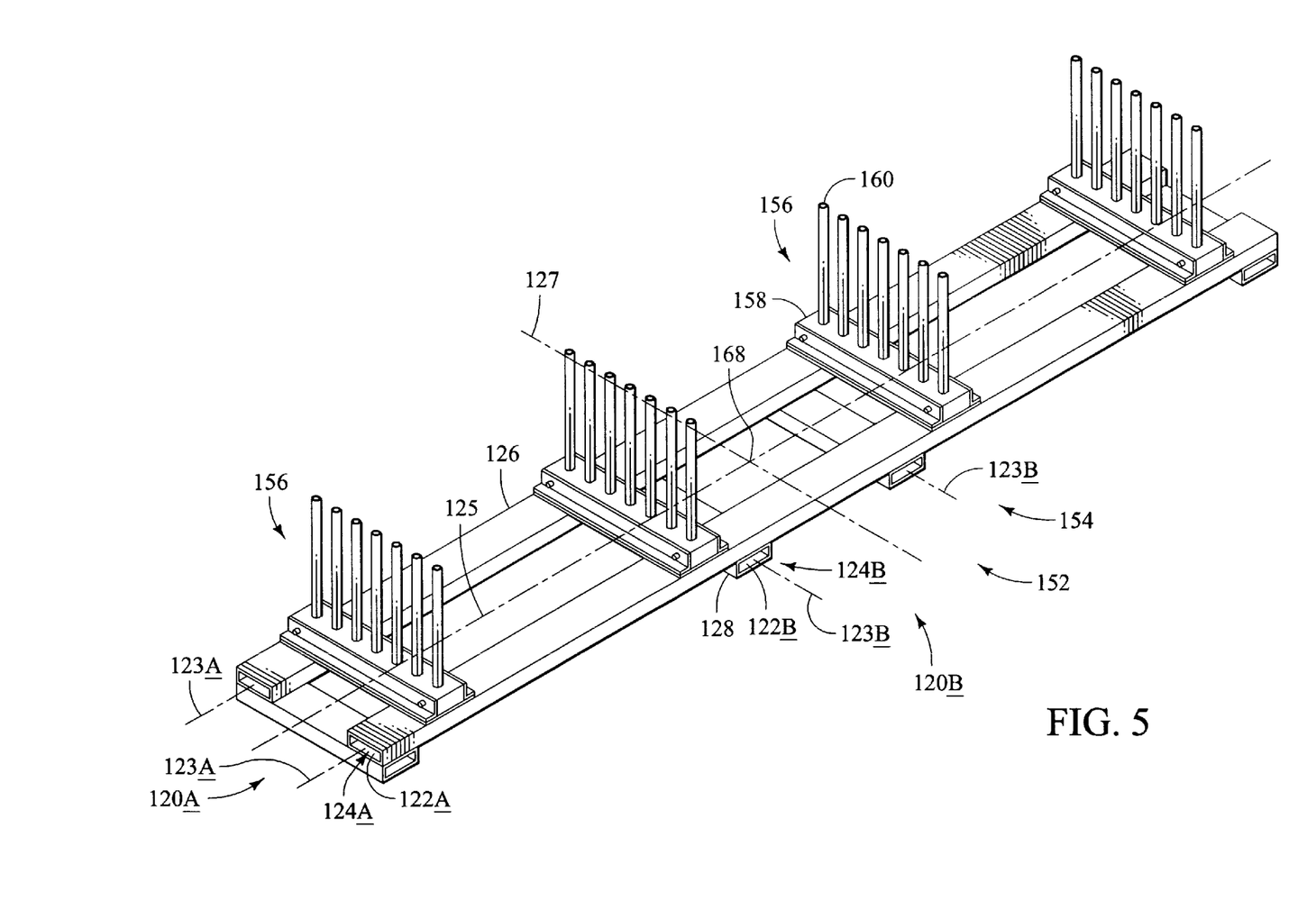
FIG. 5 is a perspective view of a frame assembly in accordance with an exemplary embodiment of the present invention.

FIG. 5 is a perspective view of a frame assembly 152 in accordance with an exemplary embodiment of the present invention. Frame assembly 152 includes a frame 154 and a plurality of combs 156 that are selectively coupled to frame 154. Each comb 156 of frame assembly 152 comprises a base 158 and a plurality of tines 160 extending away from the base 158. Frame 154 of frame assembly 152 includes a plurality of beams 126 and a plurality of cross members 128 fixed to beams 126, for example by welding.

First forklift interface 120A comprises a plurality of receptacles 124A that are preferably dimensioned to receive the forks of a forklift. In the embodiment of FIG. 2, each receptacle 124A comprises a lumen 122A defined by a beam 126. Second forklift interface 120B comprises a plurality of receptacles 124B that are also preferably dimensioned to receive the forks of a forklift. In the embodiment of FIG. 2, each receptacle 124B comprises a lumen 122B defined by a cross member 128. As shown in FIG. 2, each lumen 122A has a central axis 123A and each lumen 122B has a central axis 123B. In a preferred embodiment, the forks of a fork lift may be inserted into either end of lumens 122A, 122B.

Frame 154 has longitudinal axis 125 and a lateral axis 127 that intersect at a centroid 168 of frame 154. In the embodiment of FIG. 5, beams 126 and cross members 128 both comprise lengths of tubing having a generally rectangular cross section. In FIG. 5, it may be appreciated that each forklift interface comprises a first tube positioned on a first side of a centroid of the container and a second tube disposed on a second side of the centroid of the container. In the embodiment of FIG. 5, the first tube and the second tube of each forklift interface are positioned substantially equidistantly from the centroid of the container.

In FIG. 5 it may be appreciated that first forklift interface 120A and a second fork lift interface 120B are generally orthogonal to one another. In the embodiment of FIG. 5, each cross member 128 is arranged at about a 90 degree angle relative to each beam 126.

Figure 6:
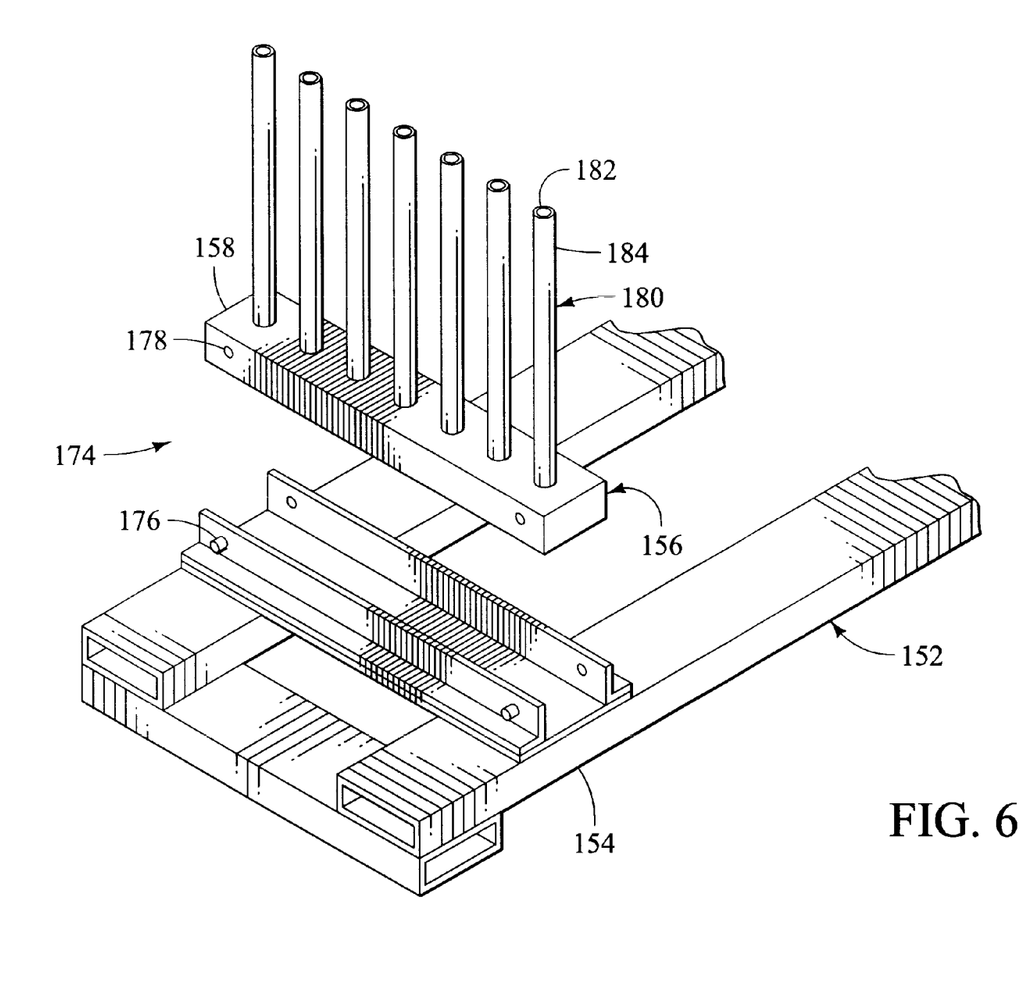
FIG. 6 is an exploded perspective view of a portion of frame assembly of FIG. 5.
Figure 7:
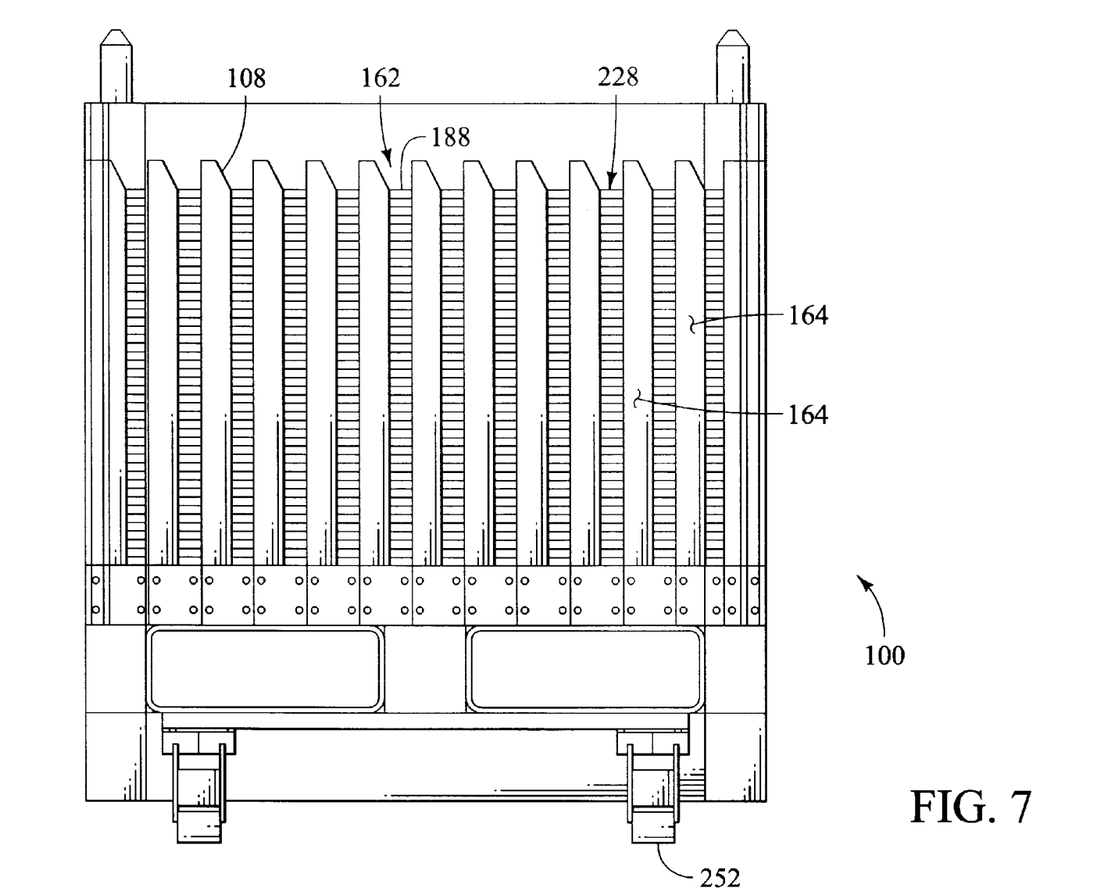
FIGS. 7 through 10 are cross sectional plan views of containers in accordance with the present invention.
Figure 8:
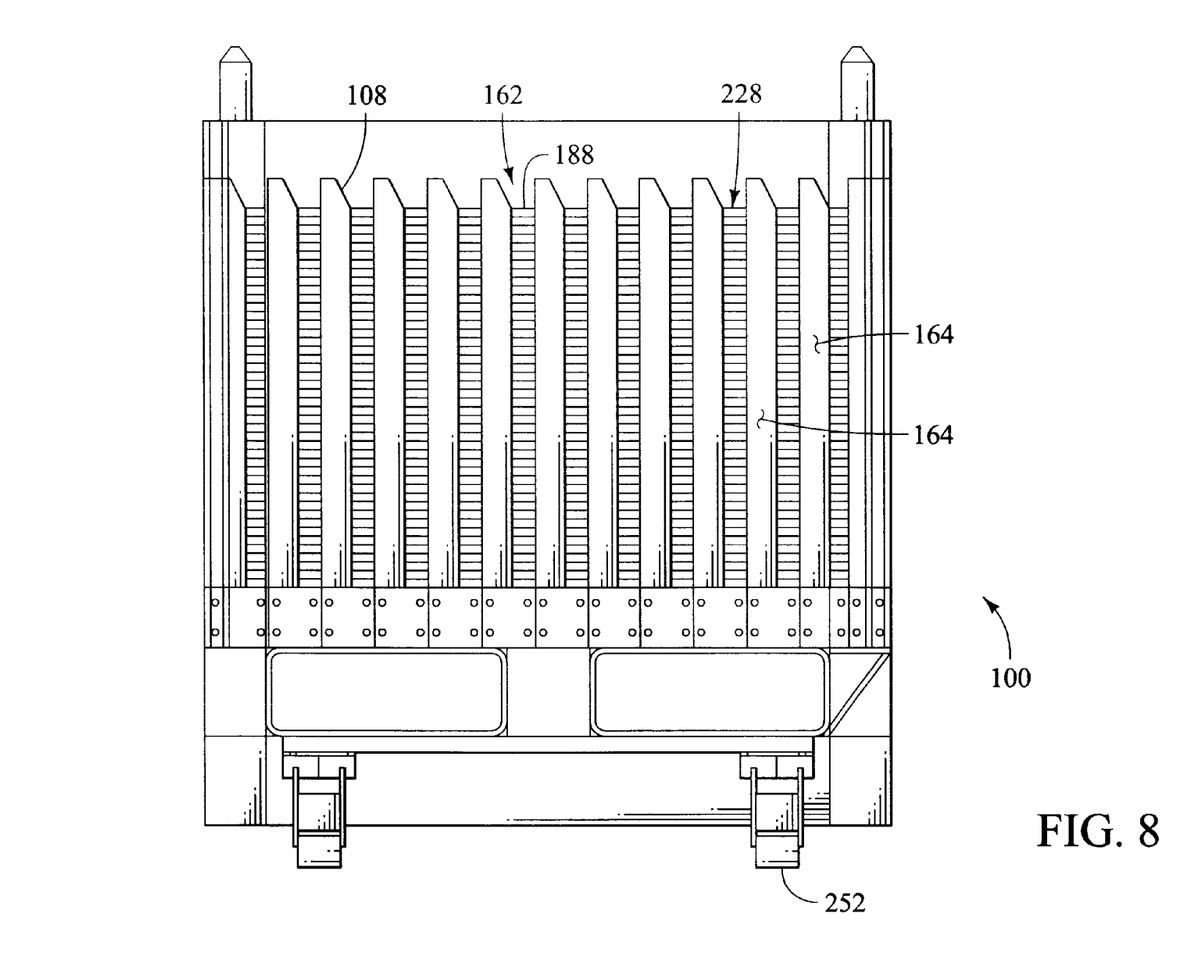
Figure 9:
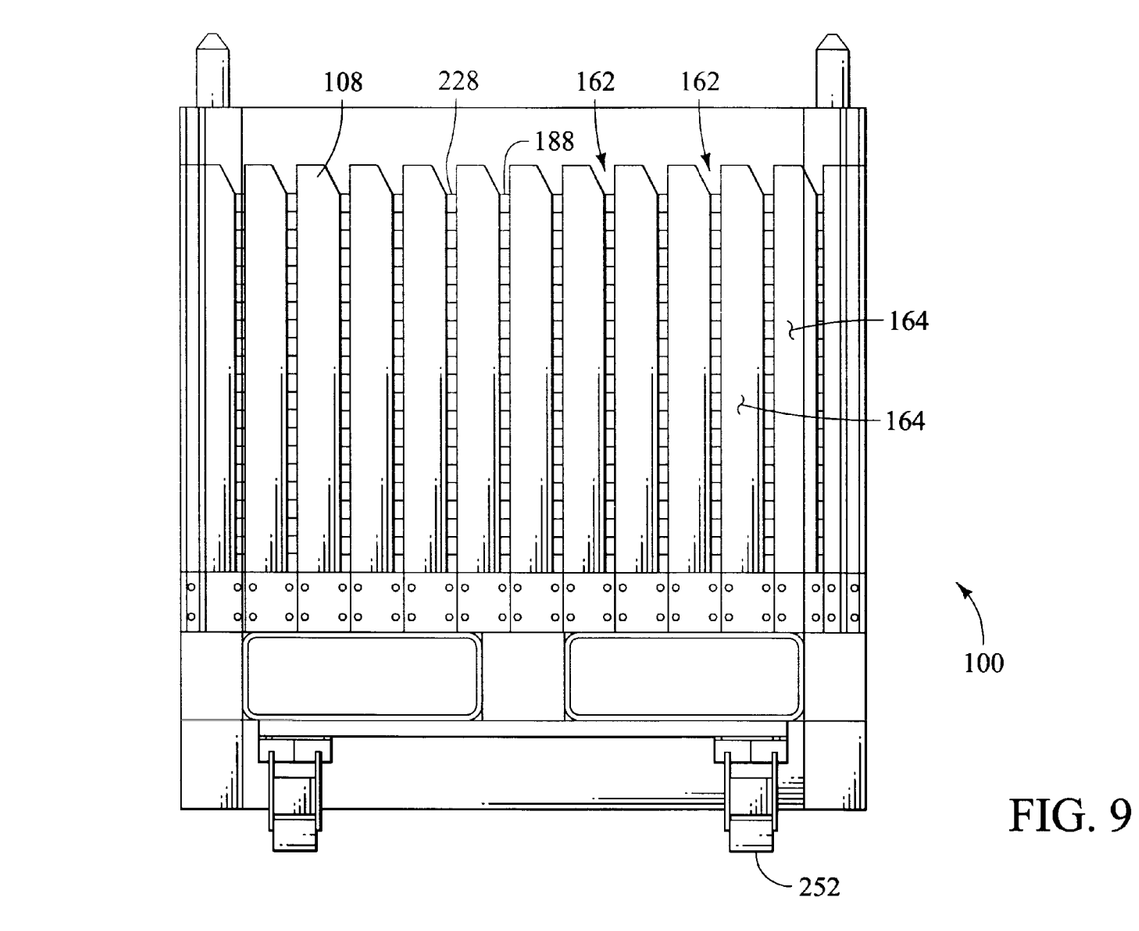
Figure 10:
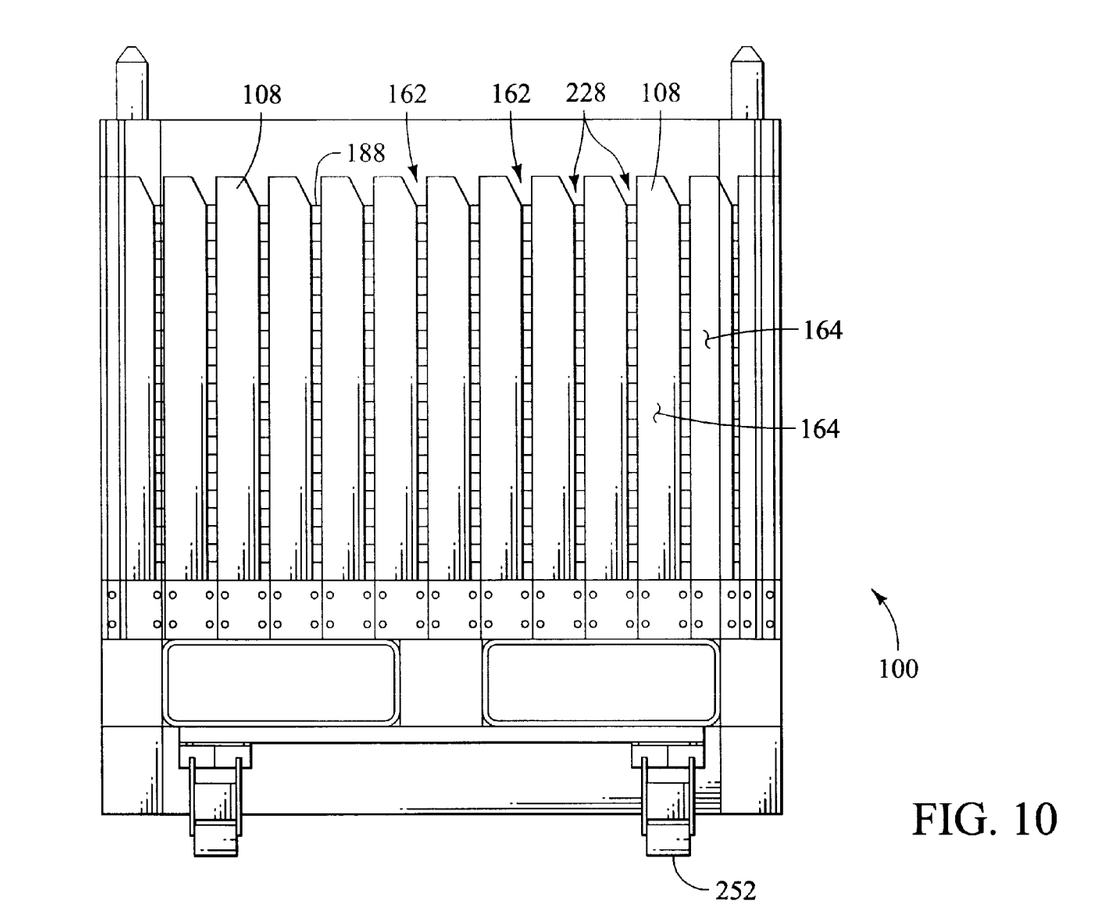

FIG. 6 is an exploded perspective view of a portion of frame assembly 152 of FIG. 5. In the embodiment of FIG. 6, one comb 156 is shown in a detached position. In some embodiments of the present invention, combs 156 are selectively coupled to frame 154 by a coupling mechanism 174. In the embodiment of FIG. 6, coupling mechanism 174 comprises a plunger 176 that is fixed to frame 154 and a detent 178 defined by base 158 of comb 156. Detent 178 is preferably dimensioned to accept at least a portion of plunger 176. Plunger 176 may comprise, for example, a ball and a spring that is arranged to bias the ball toward detent 178.

In FIG. 6, it may be appreciated that each tine 180 includes a shaft 182 and a sleeve 184 that is disposed about shaft 182. In a preferred embodiment, each sleeve 184 comprises a no-mar material that is selected to avoid damaging, marking, or causing blemishes on a bar stock material. Various no-mar materials may be used without deviating from the spirit and scope of the present invention. Examples of no-mar materials which may be suitable in some applications include polymeric materials (e.g., polyethylene and polypropylene) and elastomeric materials (e.g., polyurethane). It is to be appreciated that a container in accordance with the present invention may be configured to carry a desired type of bar stock by installing combs having tines that are dimensioned and spaced to receive the desired bar stock.

FIGS. 7 through 10 are cross sectional plan views of containers 100 in accordance with the present invention. Each container 100 includes a plurality bar locating members 108 that are preferrably dimensioned and spaced for receiving desired pre-sized bars 188. In FIGS. 7 through 10, it may be appreciated that bar locating members 108 are spaced to define a plurality of channels 162 dimensioned to accept bars having a given width. In the embodiments illustrated in FIGS. 7 through 10, a stack 228 of bars 188 is disposed within each channel 162. Also in FIGS. 7 through 10, it may be appreciated that bar locating members 108 are dimensioned to create spaces 164 between adjacent channels 162. In a preferred embodiment, each space 164 is dimensioned to receive a bar engaging member. In this preferred embodiment, each space 164 has dimensions suitable to allow access of a portion of a selection and retrieval subsystem to automatically select and retrieve bars 188 from the container, and deliver the bars to a desired location. The containers 100 illustrated in FIGS. 7 through 10 also include a plurality of casters 252. Casters 252 may facilitate movement of the containers. Containers may include, for example, casters, rollers, and wheels without deviating from the spirit and scope of the present invention.

Figure 11:
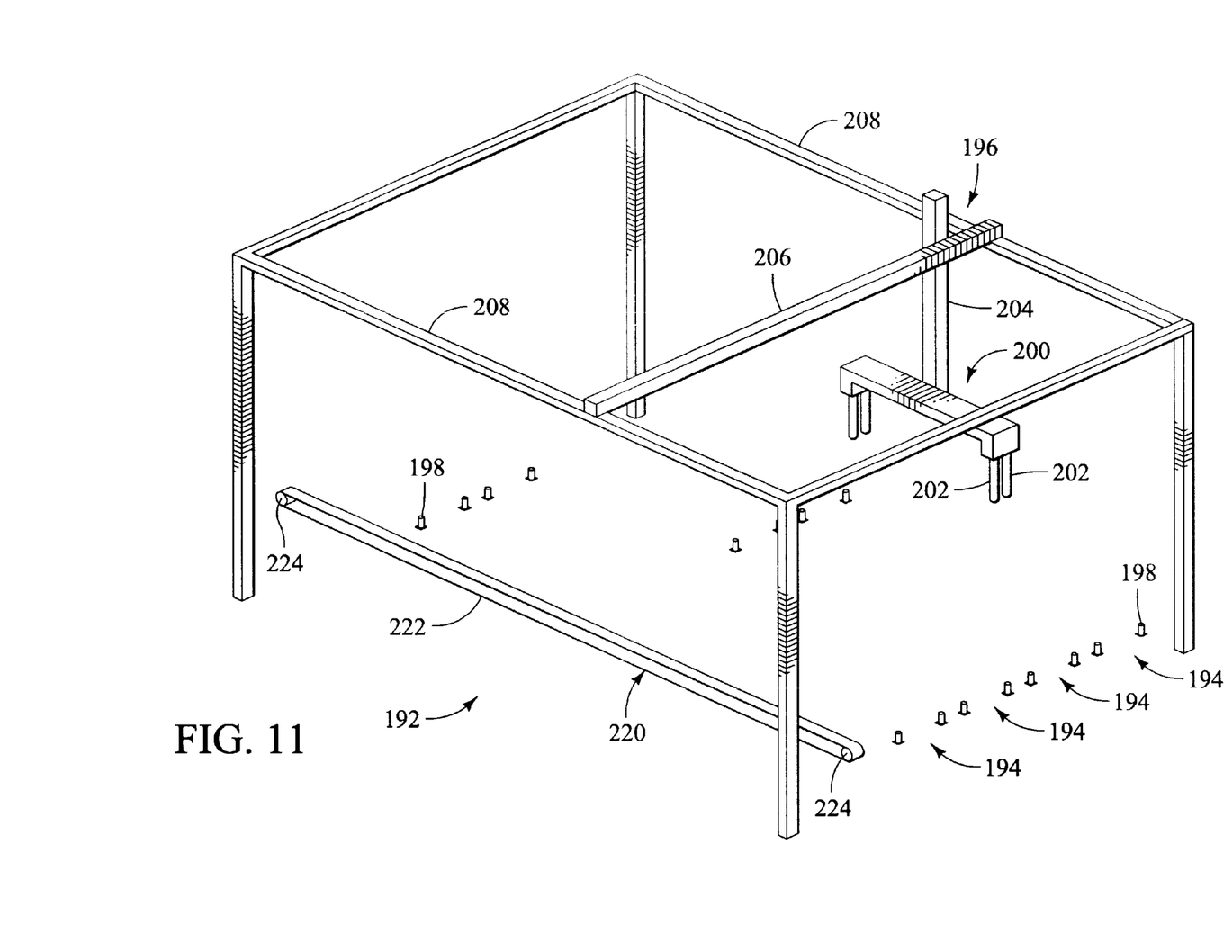
FIG. 11 is a perspective view of a system for automatically selecting and retrieving desired material from an appropriate container.

FIG. 11 is a perspective view of a system 192 for automatically selecting and retrieving desired material from an appropriate container. System 192 includes a plurality of bays 194. Each bay 194 is preferably configured to receive a container. In the embodiment of FIG. 11, each bay 194 includes a plurality of alignment pins 198.

System 192 also includes an bar engaging assembly 200 that is coupled to a motion control system 196. In the embodiment of FIG. 11, bar engaging assembly 200 includes a plurality of bar engaging members 202. In some embodiments of the present invention, two or more bar engaging members 202 may be selectively urged towards one another to trap one or more bars. The force used to urge two or more bar engaging members 202 towards one another may be provided by, for example, one or more air cylinders.

In the embodiment of FIG. 11, motion control system 196 includes a z-axis linear actuator 204, an x-axis linear actuator 206 and a plurality of y-axis linear actuators 208. In a preferred embodiment, motion control system 196 is capable of selectively placing bar engaging assembly 200 in a desired position. Motion control system 196 may comprise various elements without deviating from the spirit and scope of the present invention. For example, motion control system 196 may comprise one or more robots, one or more linear actuators, and/or one or more rotary actuators. Linear actuators which may be suitable in some applications are commercially available from Lintech Corporation of Monrovia, Calif. and Tol-o-matic Corporation of Hamel, Minn.

System 192 also includes a conveyor 220 that preferably extends through at least a portion of system 192. In some methods in accordance with the present invention, conveyor 220 may be utilized to transport material from system 192 to a desired location. In the embodiment of FIG. 11, conveyor 220 includes a belt 222 and a plurality of rollers 224. Bar engaging assembly 200 and motion control system 196 may be used to retrieve bars and place them on belt 222 of conveyor 220.

Figure 12:
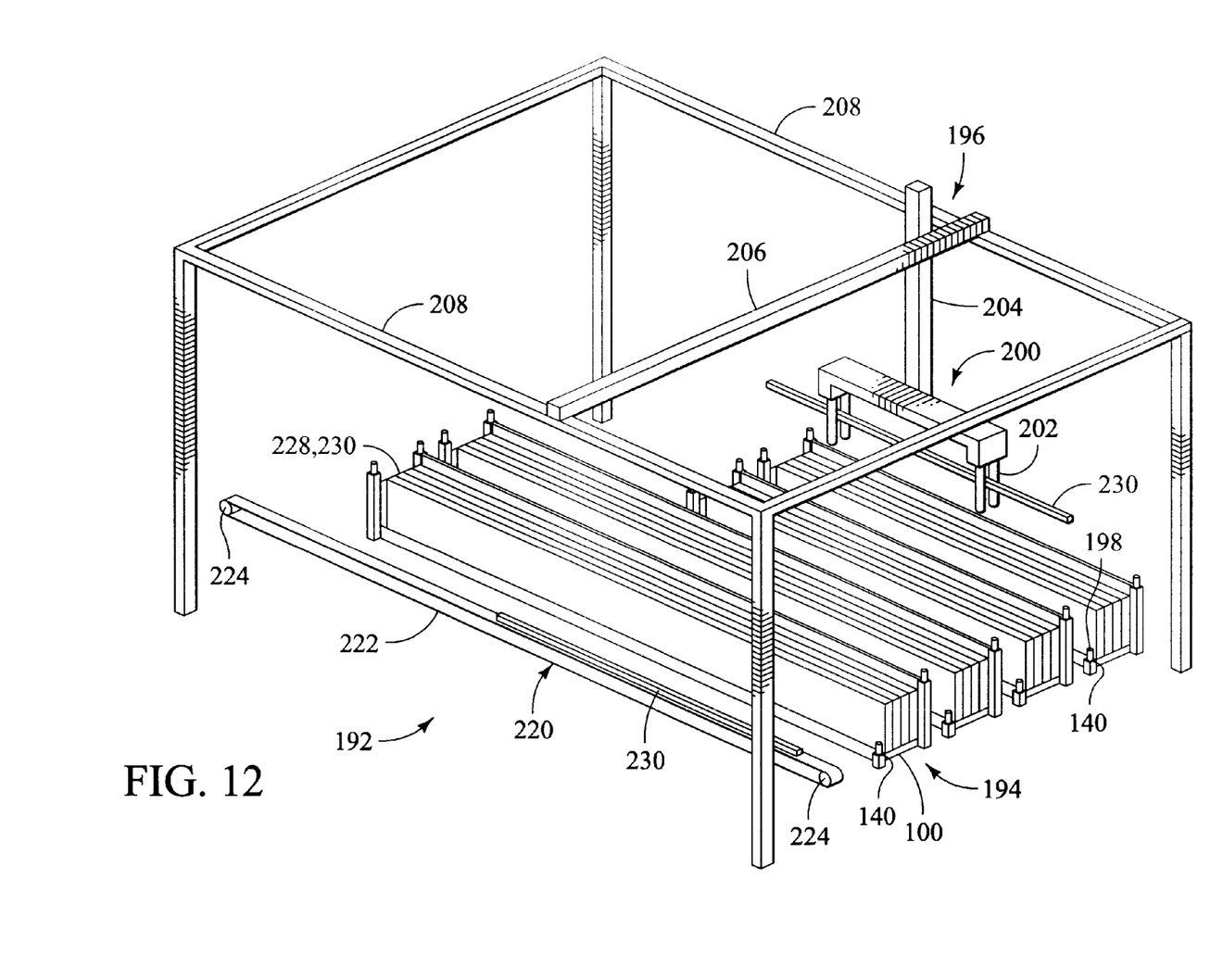
FIG. 12 is an additional perspective view a system of FIG. 11.

FIG. 12 is an additional perspective view of system 192 of FIG. 11. In the embodiment of FIG. 12, a container 100 has been positioned in each bay 194. For purposes of illustration, a portion of each container 100 is cut-away to reveal an alignment pin 198. Thus, in FIG. 12, it may be appreciated that each container 100 includes a plurality of sockets 140 that are dimensioned to receive an alignment pin 198. In some methods in accordance with the present invention, alignment pins 198 may be used to locate containers 100 relative to system 192.

In the embodiment of FIG. 12, each container 100 holds a plurality of bar stock stacks 228 which are illustrated somewhat diagramatically in FIG. 12. In some embodiments, each stack 228 comprises a plurality of bars 230 arranged one on top of the other. One bar 230 shown held by bar engaging members 202 of bar engaging assembly 200. Bar engaging assembly 200 and motion control system 196 may be used to select a container 100 containing a plurality of desired bars, remove a desired bar, and place the desired bar on belt 222 of conveyor 220. In FIG. 12, one bar 230 can be seen resting on belt 222 of conveyor 220.

Figure 13:
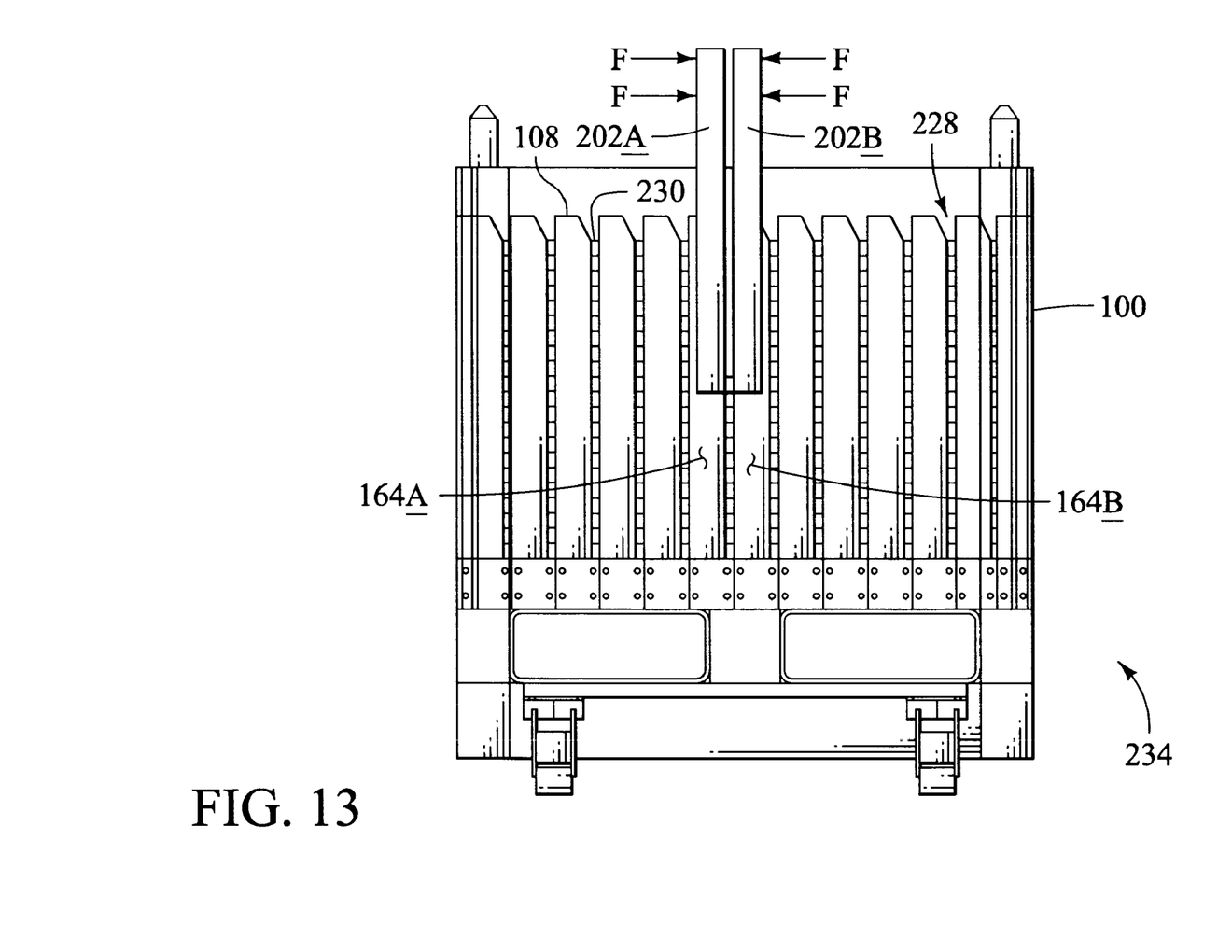
FIG. 13 is a cross sectional view of a container assembly in accordance with the present invention.

FIG. 13 is a cross sectional view of a container assembly 234 in accordance with the present invention. Container assembly 234 includes a container 100 having a plurality of bar locating members 108. A plurality of bars 230 are disposed between adjacent bar locating members 108 to form stacks 228. In FIG. 13, a first bar engaging member 202A can be seen disposed within a first space 164A defined by a plurality of bars 230. A second bar engaging member 202B is disposed in a second space 164B defined by a plurality of bars 230. In the embodiment of FIG. 13, first bar engaging member 202A and second bar engaging member 202B have been urged towards one another, and a bar 230 has been captured between first bar engaging member 202A and second bar engaging member 202B.

Figure 14:
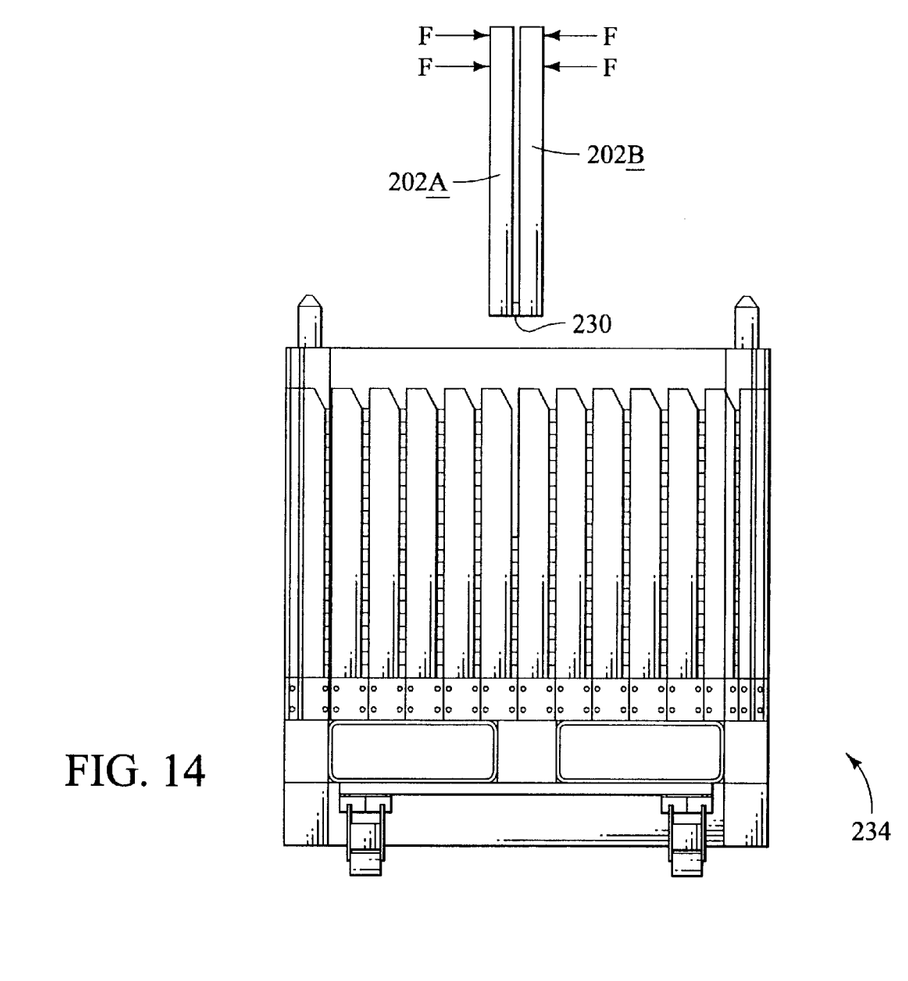
FIG. 14 is an additional cross sectional view of the container assembly of FIG. 13.

FIG. 14 is an additional cross sectional view of the container assembly 234 of FIG. 13. In the embodiment of FIG. 14, first bar engaging member 202A and second bar engaging member 202B have been moved to a new position, for example, using motion control system 196. In FIG. 14, it may be appreciated that a bar 230 has been lifted from container 100 by first bar engaging member 202A and second bar engaging member 202B.

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

What is claimed is:

1. A container for handling material for the insulating glass industry, comprising:

a container frame;

a plurality of combs fixed to the frame;

each comb including a plurality of tines;

the tines being spaced to define a plurality of channels dimensioned to accept bars having a predetermined width;

the tines being dimensioned to create spaces between adjacent channels;

each space being dimensioned to receive a bar engaging member; and the container further including a first forklift interface and a second forklift interface.

2. The container of claim 1, wherein each comb is fixed to the frame by a coupling mechanism comprising a plunger fixed to one of the frame and the comb, and a detent defined by the other of the frame and the comb;

the detent is dimensioned to accept at least a portion of the plunger; and the plunger comprises a ball and a spring arranged to bias the ball toward the detent.

3. The container of claim 1, wherein each forklift interface comprises a first receptacle and a second receptacle.

4. The container of claim 3, wherein each receptacle comprises a lumen defined by a tube.

5. The container of claim 4, wherein each forklift interface comprises a first tube positioned on a first side of a centroid of the container and a second tube disposed on a second side of the centroid of the container.

6. The container of claim 5, wherein the first tube and the second tube are positioned substantially equidistantly from the centroid of the container.

7. The container of claim 4, where in the lumens of the second forklift interface are disposed at an angle relative to the lumens of the first forklift interface.

8. The container of claim 7, wherein the angle is about a 90 degree angle.

* * * * *